United States Patent
Fay et al.

(10) Patent No.: US 7,693,894 B1
(45) Date of Patent: Apr. 6, 2010

(54) SYSTEM AND METHOD FOR CACHING AND UTILIZING FLIGHT AVAILABILITY DATA

(75) Inventors: Diane Fay, Atlanta, GA (US); Lori Senn, Atlanta, GA (US)

(73) Assignee: Travelport, LP, Parsippany, NJ (US)

( * ) Notice: Subject to any disclaimer, the term of this patent is extended or adjusted under 35 U.S.C. 154(b) by 177 days.

(21) Appl. No.: 11/351,945

(22) Filed: Feb. 10, 2006

Related U.S. Application Data

(62) Division of application No. 10/114,748, filed on Apr. 1, 2002, now Pat. No. 7,062,480.

(51) Int. Cl.
*G06F 7/00* (2006.01)

(52) U.S. Cl. .................. 707/705; 707/758; 707/770; 707/782; 707/785

(58) Field of Classification Search .................. None
See application file for complete search history.

(56) References Cited

U.S. PATENT DOCUMENTS

| | | | |
|---|---|---|---|
| 5,832,451 A | 11/1998 | Flake et al. | |
| 6,134,534 A | 10/2000 | Walker et al. | |
| 6,161,097 A | 12/2000 | Glass et al. | |
| 6,219,680 B1 | 4/2001 | Bernardo et al. | |
| 6,263,315 B1 | 7/2001 | Talluri | |
| 6,269,365 B1 | 7/2001 | Kiyoki et al. | |
| 6,275,808 B1 | 8/2001 | DeMarcken | |
| 6,289,358 B1 | 9/2001 | Mattis et al. | |
| 6,295,521 B1 | 9/2001 | DeMarcken et al. | |
| 6,307,572 B1 | 10/2001 | DeMarcken et al. | |
| 6,360,205 B1* | 3/2002 | Iyengar et al. | 705/5 |
| 6,418,413 B2* | 7/2002 | DeMarcken et al. | 705/5 |
| 6,430,561 B1 | 8/2002 | Austel et al. | |
| 6,493,810 B1 | 12/2002 | Pang et al. | |
| 6,625,603 B1 | 9/2003 | Garg et al. | |

FOREIGN PATENT DOCUMENTS

WO    WO 01/33472    5/2001

* cited by examiner

*Primary Examiner*—Hung Q Pham
(74) *Attorney, Agent, or Firm*—Womble Carlyle Sandridge & Rice, PLLC

(57) ABSTRACT

A system and method operable to cache and retrieve flight availability data. System components are a cache database for storing flight availability data, an airline cache control for configuring the cache database for a plurality of airlines, a subscriber cache control for configuring the cache database for a plurality of subscribers, and a cache query utility for interacting with the cache database. Additional system components are a data display utility for displaying flight availability data stored in the cache database, a success rate utility for tracking statistics associated with use of the cache database, and a dual mode processing utility that allows access to flight availability data from either the cache database or a real-time response. The system is provided as an intermediary between the subscribers and a plurality of airline servers.

28 Claims, 3 Drawing Sheets

SYSTEM AND METHOD FOR CACHING AND UTILIZING FLIGHT AVAILABILITY DATA

CROSS-REFERENCE TO RELATED APPLICATION

This application is a division of application Ser. No. 10/114,748 filed Apr. 1, 2002 now U.S. Pat. No. 7,062,480.

BACKGROUND OF THE INVENTION

The present invention relates to airline flight availability data. More particularly, the present invention relates to an efficient system and method of caching and utilizing airline flight availability data for specific subscribers.

Booking an airline flight requires access to flight availability data, such as flight schedules and availability of seats. This information is updated and controlled by airlines and available from their airline servers.

In the past, only travel agents and airline personnel had access to airline servers and flight availability data. Computer systems allowed travel agents to be networked to airline servers through proprietary networks not available to individual clients. The proprietary networks were typically operated by travel information providers who provided electronic distribution of travel information to subscribing travel agencies. This limited access to airline servers and burdens placed on them.

With the ever increasing use of the Internet, many Internet web sites have been developed that also subscribe to services provided by travel information providers and allow individual clients to request flight availability data. When travel information providers receive flight availability data requests from their subscribers, they typically access airline servers in order to fulfill those requests. Therefore, each flight availability data request places burdens on both travel information providers and airline servers.

Many travel information providers rely on real-time requests to airline servers for flight availability data. Real-time requests may be either direct access availability requests or seamless availability requests. Since direct access requests and seamless availability requests are real-time requests, they reflect current flight availability data. Direct access requests provide information based on the identity of an individual subscriber and include all classes of service available to that subscriber. However, direct access requests are specific to each airline and subscribers must generate a unique direct access request for each airline from which they would like flight availability data. Furthermore, direct access cannot be used when airline servers are unavailable.

Seamless availability requests allow subscribers to access flight availability data from multiple airlines simultaneously. Seamless availability requests provide information based on the identity of an individual subscriber and include all classes of service available to that subscriber. However, seamless availability requests cannot be used when airline servers are unavailable.

Allowing individual clients to request flight availability data through real-time requests has dramatically increased burdens placed on travel information providers and airline servers. Specifically, as people increasingly use these web sites to check flight availability data, network traffic through travel information providers to airline servers increases.

Additionally, many travel agencies now use advanced search tools that also dramatically increase burdens placed on travel information providers and airline servers. These advanced search tools may generate several real-time requests for one trip, in an effort to find a low cost alternative or an alternate route.

Use of these web sites and advanced search tools leads to system overload conditions, such as network congestion, inadequate processing capacity, and inadequate infrastructure. System overload conditions can make airline servers unavailable. These issues lead to lost sales, denied sales, and other related problems. Therefore, many airlines and travel information providers have expressed a need to reduce these burdens.

A current method of obtaining flight availability data when airline servers are unavailable relies on availability status messages (AVS) received from airline servers and stored in a third party database. This AVS system is generic and cannot provide information based on the identity of a subscriber. Therefore, the AVS system may not include all classes of service available to any one subscriber. Additionally, the AVS system stores flight availability data based on each individual flight and not based on a trip's actual origin and destination. Therefore, the AVS system may not reflect complete flight availability data. Furthermore, the AVS system relies on the airline servers to keep it updated and, for that reason, may not reflect the most current flight availability data. Finally, in deciding whether or not to sell each trip, airlines consider many factors, such as the identity of the subscriber and the actual origin and destination. For these reasons, airlines often deny sales when the AVS system shows that there are seats available.

The AVS system can be useful for quick checks of flight availability data. However, subscribers must use a real-time request for accurate checks of updated flight availability data.

Accordingly, there is a need for an improved system and method of caching and utilizing airline flight availability data for specific subscribers that overcomes the limitations of the prior art.

SUMMARY OF THE INVENTION

The present invention overcomes the above-identified problems and provides a distinct advance in the art. More particularly, the present invention provides a system and method of efficiently caching and utilizing airline flight availability data for specific subscribers.

The system is preferably used by a plurality of subscribers as a bridge to a plurality of airline servers and is capable of responding to an availability request with an availability response containing flight availability data. The system receives the availability request and, if necessary, may send a real-time request to the airline servers. When the system receives a real-time response from the airline servers, flight availability data from the real-time response is used to send the availability response to the requesting subscriber.

The system broadly comprises a cache database for temporarily storing or caching flight availability data received from the airline servers, an airline cache control for configuring the cache database specifically for each of a plurality of airlines, a subscriber cache control for configuring the cache database specifically for each of the subscribers, and a cache query utility for interacting with the cache database. The system further comprises a data display utility for displaying flight availability data stored in the cache database, a success rate utility for tracking statistics associated with use of the cache database, and a dual mode processing utility that allows a technician to access flight availability data from either the cache database or the real-time responses.

Flight availability data from the real-time response may be stored in the cache database and used to fulfill subsequent availability requests from the same subscriber. The stored flight availability data may be used instead of sending another real-time request to the airline servers, thereby reducing a total number of real-time requests and real-time responses the system and the airline servers must handle. Additionally, the stored flight availability data may be utilized when either the real-time request or the real-time response fails.

The cache database is preferably configured to only store flight availability data for subscribers identified by a subscriber identification (SID) and airlines identified by an airline carrier code (CC) that have been configured to use the cache database. This enables fast access to the flight availability data for those SIDs and CCs.

The airline cache control is used to configure a day range, a shelf-life, and a minimum seat count for flight availability data stored in the cache database for each airline. The day range specifies for how many days in the future flight availability data should be cached. The shelf-life is the maximum amount of time the cached availability data is stored for use and is preferably no greater than 30 minutes in order to prevent flight availability data from becoming stale. The seat count may be used to specify a minimum number of available seats in order to use flight availability data stored in the cache database.

The airline control also allows each airline to identify specific SIDs that may use flight availability data stored in the cache database for that airline. Alternatively, each airline may allow any SID to use flight availability data stored in the cache database for that airline.

The subscriber control is used to configure each SID to use or not use flight availability data stored in the cache database. Additionally, the subscriber control allows SIDs to be grouped into SID families and each SID family to be configured as either access-type or update-type. Access-type allows each SID in an access-type SID family to access the flight availability data stored in the cache database for that SID family. However, a child SID in the access-type SID family may not update the cache database. Only a parent SID of the access-type SID family may update the cache database. Update-type allows each SID in an update-type SID family to both access and update the flight availability data stored in the cache database for that SID family. Flight availability data is stored in the cache database specifically for each SID or SID family and is only available to that SID or SID family.

The cache query utility interfaces with the cache database on behalf of the subscribers and deletes trips from the cache database after their shelf-life has expired, as configured in the airline cache control. When flight availability data is received from one of the airline servers in the form of the real-time response, the cache query utility adds the flight availability data to the cache database for use by the subscriber that generated the availability request. When each availability request is received, the cache query utility queries the cache database for a matching trip and forwards any appropriate flight availability data to the requesting subscriber.

The success rate utility tracks statistics associated with use of flight availability data stored in the cache database and includes a sell failure rate, a total attempts number, and a total use number. The sell failure rate indicates the percentage rate of sell failures resulting from attempts to sell a trip based upon flight availability data stored in the cache database and can be compared to sell failure rates from the real-time request and sell failure rates from the third party database. The total attempts number indicates how many times flight availability data is queried from the cache database. The total use number indicates how many times flight availability data is returned as a result of querying the cache database. These statistics can be viewed in total, by specific airline, by specific SID, or by specific SID family.

The dual mode processing utility is designed for testing and troubleshooting the system, requesting servers, airline servers, and network connectivity. The dual mode processing utility allows a technician to access flight availability data from either the cache database or the real-time responses. This allows comparisons to determine accuracy of the cache database.

The cache database may be used to back-up an airline server that is experiencing network congestion or outages. If the system sends the real-time request to the airline server but the real-time response is not received, the system may use flight availability data stored in the cache database. If the matching trip does not exist in the cache database, the third party database may be used to populate the availability response.

In one aspect of the invention, a method, system and computer program product are provided for caching and utilizing airline flight availability data for specific subscribers. An availability request is received from a subscriber. A real-time request for flight availability data is sent to an airline server. In the event of a communication failure before receipt of a response to the real-time request from the airline server, a cache database is queried for flight availability data stored for the subscriber that corresponds to the availability request from the subscriber. The flight availability data retrieved in response to the query is sent to the subscriber.

Additionally, the cache database may be used as a primary source of flight availability data. In this case, when the availability request is received, the system verifies that the SID is configured to utilize the cache database. The system also verifies that the CC is configured to utilize the cache database. The system then queries the cache database for the matching trip as specified in the availability request. If the cache database contains the matching trip and the matching trip was stored for use by the subscriber, then flight availability data for the matching trip is returned to the subscriber in the form of the availability response. If no matching trip is found, then the system sends the real-time request to the airline servers. Flight availability data returned in the real-time response is used to populate the availability response and the cache database for future use by the subscriber.

If any step fails, a third party database may be used to fulfill the availability request. For example, when no matching trip exists in the cache database, the real-time request is sent to the airline servers. If the real-time response is not received, then flight availability data from the third party database is used to populate the availability response.

BRIEF DESCRIPTION OF THE DRAWINGS

These and other advantages and aspects of the present invention will become apparent and more readily appreciated from the following detailed description of the invention taken in conjunction with the accompanying drawings, as follows.

DETAILED DESCRIPTION OF THE INVENTION

The following description of the invention is provided as an enabling teaching of the invention and its best, currently known embodiment. Those skilled in the art will recognize that many changes can be made to the embodiments described while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations of the invention are possible and may even be desirable in certain circumstances and are part of the present invention. Thus, the following description is provided as illustrative of the principles of the invention and not in limitation thereof since the scope of the present invention is defined by the claims.

Figure 1:
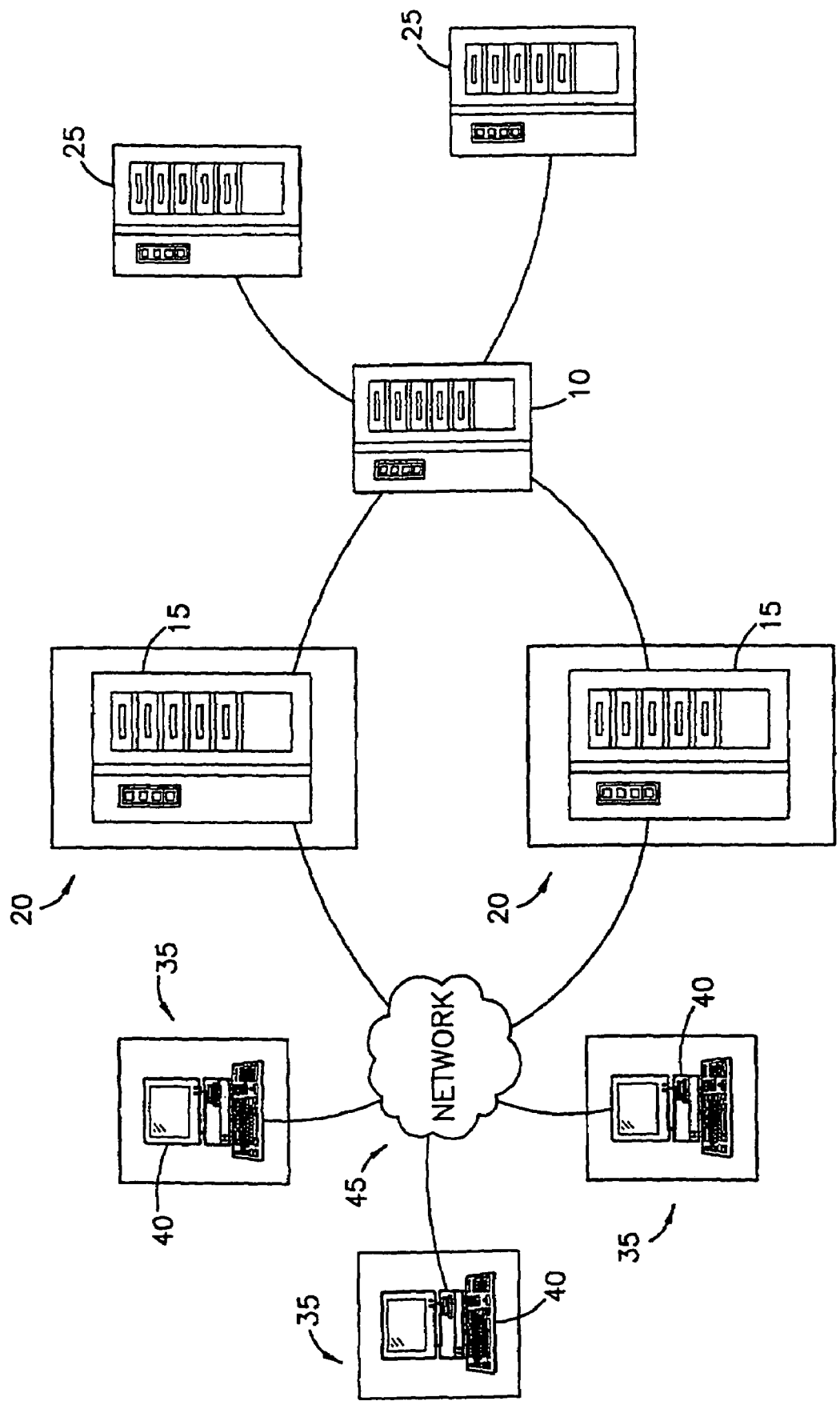
FIG. 1 illustrates a block diagram of a system operable to cache and utilize airline flight availability data according to an exemplary embodiment of the invention in an environment wherein the system is connected to a plurality of subscribers and a plurality of airline servers.

Referring to FIG. 1, the exemplary system 10 is capable of caching and utilizing airline flight availability data and is preferably used as a bridge between a plurality of requesting servers 15 operated by a plurality of subscribers 20 and a plurality of airline servers 25. The system 10 is capable of responding to an availability request with an availability response containing flight availability data obtained by sending a real-time request to the airline servers 25 and receiving a real-time response from the airline servers 25. The system 10 is preferably operated by a company that provides electronic distribution of travel information to travel agencies, travel providers, and other corporations.

The subscribers 20 may be Internet web sites that provide flight availability data to a plurality of clients 35. Each subscriber 20 may operate one or more requesting server 15 and each requesting server 15 may be customized for each subscriber 20. Each client 35 preferably operates one of a plurality of personal computers 40 and communicates with one of the requesting servers 15 through a network 45, such as, the Internet. The network 45 may be operated by the subscribers 20 or a third party network connectivity supplier.

For example, one of the clients 35 may use his or her personal computer 40 to access one of the requesting servers 15 operated by one of the subscribers 20 through the network 45. The client 35 may use the requesting server 15 to plan a trip and access flight availability data supplied by one or more of the airline servers 25 through the system 10.

Alternatively, the subscribers 20 may be individual travel agents or travel agencies. Additionally, the requesting servers 15 may be simple dumb terminals connected directly to the system 10. Furthermore, the subscribers 20 may connect to the system 10 using on-demand connections, such as a dial-up connection.

The requesting servers 15 send the availability request to the system 10. The availability request typically includes a subscriber identification (SID) identifying the subscriber 20 originating the availability request, an origin, and a destination. Additionally, the availability request may include a return trip which would start at the destination and finish at the origin. Furthermore, the availability request may specifically involve stops at locations other than the origin and the destination, include an airline carrier code (CC) identifying a specific airline, and/or specify certain dates and times for which to search.

The system 10 receives the availability request and, if necessary, may send the real-time request to the airline servers 25. The real-time request sent from the system 10 may account for factors, such as minimum connection times between flights, regulatory display parameters, and other criteria.

Other applications, such as advanced search tools, may also request flight availability data. Advanced search tools are typically used to find a lower fare and/or alternatives to a requested trip. Advanced search tools gather information, such as departure times and customer preferences for each trip. This information is used to construct alternate itineraries. For example, if a trip starts in Los Angeles and finishes in New York, alternate itineraries might include stops in Denver, Kansas City, and/or Chicago.

These applications may be operated by either the company or the subscribers 20. However, since these applications generate availability requests on behalf of a specific subscriber 20, it will be understood that the term subscriber 20 used throughout this document includes these applications.

Figure 2:
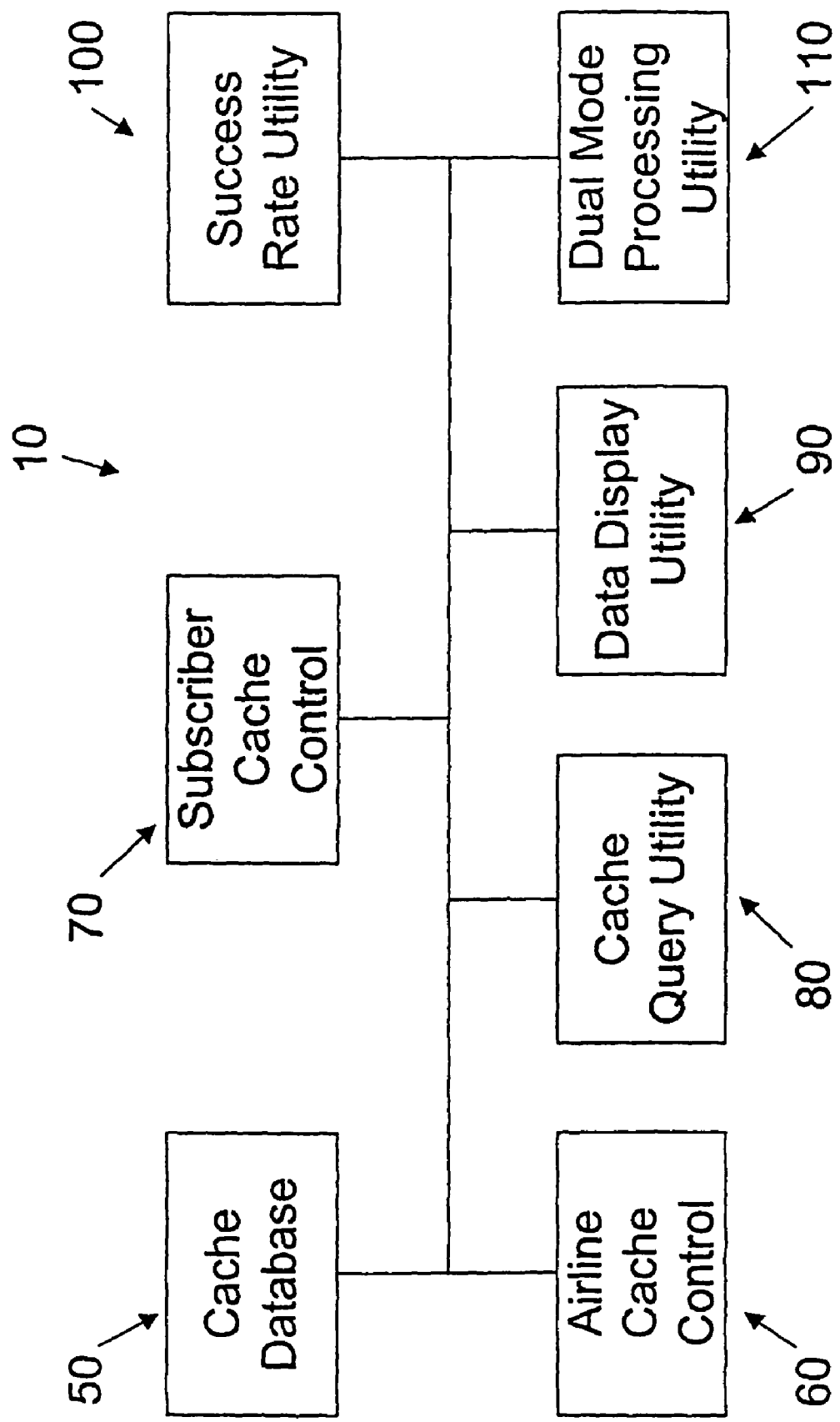
FIG. 2 illustrates a block diagram of the components of the cache system in accordance with an exemplary embodiment of the present invention.

Also referring to FIG. 2, the system 10 broadly comprises a cache database 50 for temporarily storing or caching flight availability data, an airline cache control 60 for configuring the cache database 50 specifically for each of a plurality of airlines, a subscriber cache control 70 for configuring the cache database 50 specifically for each subscriber 20, and a cache query utility 80 for interacting with the cache database 50. The system 10 further comprises a data display utility 90 for displaying flight availability data stored in the cache database 50, a success rate utility 100 for tracking statistics associated with use of the cache database 50, and a dual mode processing utility 110 that allows a technician to access flight availability data from either the cache database 50 or the real-time responses.

The cache database 50 is preferably SID and CC specific and configured to only store flight availability data for SIDs and CCs that have been configured to use the cache database 50. This enables fast access to the flight availability data for those SIDs and CCs.

Flight availability data stored in the cache database 50 may be utilized to fulfill subsequent availability requests from the subscriber 20 for which the flight availability data was stored instead of requesting flight availability data again. This reduces a total number of real-time requests and real-time responses that must be handled by the system 10 and the airline servers 25. Additionally, flight availability data stored in the cache database 50 may be utilized when either the real-time request or the real-time response fails.

Trips are preferably stored in the cache database 50 with complete flight availability data including the SID, the CC, one or more boarding points, one or more classes of service, one or more flight numbers, dates, times, and a seat count for every flight in the trip. However, due to selective polling, trips may be stored in the cache database 50 without complete flight availability data. Selective polling is when a particular airline has requested that the system 10 does not request flight availability data for specific flights. Flights for which the system 10 does not request flight availability data are known as non-polled flights.

If a trip includes one or more non-polled flights, the complete trip will typically be included in the availability request. However, the system 10 does not request flight availability data for the non-polled flights in the real-time request. Therefore, the real-time response will not include flight availability data for the non-polled flights and flight availability data from a third party database may be used to populate the availability response for the non-polled flights.

While the trip is stored in the cache database 50 with an indication of each flight in the trip, any non-polled flights will not reflect flight availability data. Specifically, flight availability data from the third party database is not stored in the cache database 50. When the system 10 receives another availability request, the cache database 50 is queried for the trip and the flight availability data in the cache database 50 is combined with flight availability data from the third party database in order to fulfill the availability request.

The airline cache control 60 is used to configure a day range, a shelf-life, and a minimum seat count for flight availability data stored in the cache database 50 for each airline identified by each CC. The day range comprises three digits and can be any number from 000 to 331. The day range specifies for how many days in the future flight availability data is cached, where 000 represents the current day. Typically, up to five day ranges are configured for each airline. Day ranges do not overlap and all days between 000-331 are preferably accounted for. Each day range can be independently configured, either preventing or allowing applicable fight availability data to be cached, with a unique shelf-life.

For example, the cache database 50 may be configured to cache a specific airline's flight availability data in five day ranges. A first day range could be configured to cover all days from the current day to 30 days in the future. Anticipating that flight availability data for trips within 30 days will change rapidly, the airline may decide to not cache flight availability data for the first day range. A second day range could be configured to cover from 31 days to 60 days in the future with a 10 minute shelf life, in order to avoid using flight availability data more than 10 minutes old. A third day range could be configured to cover from 61 days to 90 days in the future with a 20 minute shelf-life, not anticipating the flight availability data to change as rapidly as it might for the second range. A fourth day range could be configured to cover from 91 days to 120 days in the future. A fifth day range could be configured to cover from 121 days to 331 days in the future. Both the fourth and fifth day ranges may be configured with a 30 minute shelf-life, not anticipating the flight availability data to change as rapidly as it might for either the second day range or the third day range.

While an example has been described above, any combination of day ranges and shelf-life may be configured. The shelf-life is preferably no greater than 30 minutes in order to prevent flight availability data from becoming stale.

The seat count may be used to specify a minimum number of available seats in order to use flight availability data stored in the cache database 50. The seat count is an optional criteria preferably used to determine if sending the real-time request to the airline servers 25 is necessary. Therefore, the seat count is preferably not used when the cache database 50 is queried as a result of failing to receive the real-time response. For example, if the airline decides that the minimum seat count is 7, all requested classes of service in the cache database 50 must have a seat count equal to or more than 7 seats. If the flight availability data stored in the cache database 50 reflects 6 or fewer seats for any flight in the trip, then the real-time request is sent to the airline servers 25. If the real-time response is not received, then the flight availability data reflecting only 6 seats may be used to populate the availability response. Furthermore, if a matching trip does not exist in the cache database 50 or the real-time response is not received, the third party database may be used to populate the availability response.

The airline control 60 may also be used to limit which SIDs may use flight availability data stored in the cache database 50 for each airline. Alternatively, each airline may choose to not limit any SID's use of flight availability data stored in the cache database 50 for that airline.

Finally, the airline control 60 may be used to allow specific applications to use flight availability data stored in the cache database 50 for each airline. For example, a specific airline may decide to not allow the advanced search tools to use flight availability data stored in the cache database 50. Alternatively, another airline may require that the advanced search tools use flight availability data stored in the cache database 50, while other applications are required to use flight availability data received from the real-time response.

The subscriber control 70 may be used to group each SID into one of a plurality of SID families. Flight availability data is stored in the cache database 50 specifically for each SID or SID family and only available to that SID or SID family. Each SID family consists of one parent SID and one or more child SIDs. Each parent SID may be used in two SID families provided each SID family is of a different type. Each SID family is identified by the parent SID and flight availability data is stored in the cache database 50 under the parent SID. Each child SID is preferably only a member of one SID family. Additionally, each SID family is assigned a family name which is preferably free flow text with up to 15 alphanumeric characters or spaces.

The subscriber control 70 may also be used to configure each SD or SID family to use or not use flight availability data stored in the cache database 50. Additionally, the subscriber control 70 allows each SID family to be configured as either access-type or update-type. Access-type allows each SID in an access-type SID family to access the flight availability data stored in the cache database 50 for that SID family. However, none of the child SIDs in the access-type SID family may update the cache database 50. Only the parent SID of the access-type SID family may update the cache database 50. Update-type allows each SID in an update-type SID family to both access and update the flight availability data stored in the cache database 50 for that SID family.

The cache query utility 80 interfaces with the cache database 50 on behalf of the subscribers 20 and deletes trips from the cache database 50 after the shelf-life has expired, as configured in the airline cache control 60. When flight availability data is received from one of the airline servers 25 in the form of the real-time response, the cache query utility 80 adds the trip to the cache database 50 for use by the subscriber 20 that initiated the availability request. When another availability request is received, the cache query utility 80 queries the cache database 50 for matching trips and forwards any appropriate flight availability data to the requesting subscriber 20.

The data display utility 90 can be used to display flight availability data stored in the cache database 50. The data display utility 90 is primarily a troubleshooting tool designed to assist a technician in diagnosing interface problems between the cache database 50 and the requesting servers 15 or the airline servers 25.

The success rate utility 100 tracks statistics associated with use of flight availability data stored in the cache database 50 and includes a sell failure rate, a total attempts number, and a total use number. The sell failure rate indicates the percentage rate of sell failures resulting from attempts to sell a trip based upon flight availability data stored in the cache database 50 and can be compared to sell failure rates from the real-time request and sell failure rates from the third party database. The total attempts number indicates how many times the cache database 50 is queried for flight availability data. The total use number indicates how many times flight availability data is returned as a result of querying the cache database 50. These statistics can be viewed in total, by specific airline, by specific SID, or by specific SID family.

These statistics are preferably refreshed every 15 minutes and available to view online through the success rate utility 100. Additionally, these statistics will preferably automatically clear each day at midnight eastern time. Alternatively, these statistics for the current day plus seven previous days can be made available on a website.

The dual mode processing utility 110 is designed for testing and troubleshooting the system 10, requesting servers 15, airline servers 25, and network connectivity. The dual mode processing utility 110 allows a technician to access flight availability data from either the cache database 50 or the real-time responses. This allows comparisons to determine accuracy of the cache database 50.

It is anticipated that features may be added to the system 10, in order to enhance the system's 10 functionality. A decrement feature may be added that counts the number of sells against the flight availability data stored in the cache database 50 to determine if a trip needs to be updated. A denial feature is used to automatically update a trip when an attempt to sell the trip is rejected by the airline. An overlapping feature may be added to allow overlapping day ranges and shelf-lives. A selective feature may be added to select certain flights for which flight availability data is not to be stored in the cache database 50. Other features may be added to link multiple SID families, group SID families by airline, and/or automatically activate the dual mode processing utility 110 at periodic intervals and report any discrepancies. Still other features may be added to clean and verify the flight availability data in the cache database 50 at a set time and track the statistics by individual requesting servers 15. Finally, a market feature may be used to activate cache by specific markets, such as trips from New York to London.

While the present invention has been described above, it is understood that substitutes can be made. For instance, the airline cache control 60 may be modified to allow more than five day ranges or more than 30 minutes of shelf-life. Additionally, the seat count may be used to influence the shelf-life. For example, if the seat count is at or near the minimum seat count specified in the airline control 60, then the shelf-life may be reduced. These and other minor modifications are within the scope of the present invention.

Figure 3:
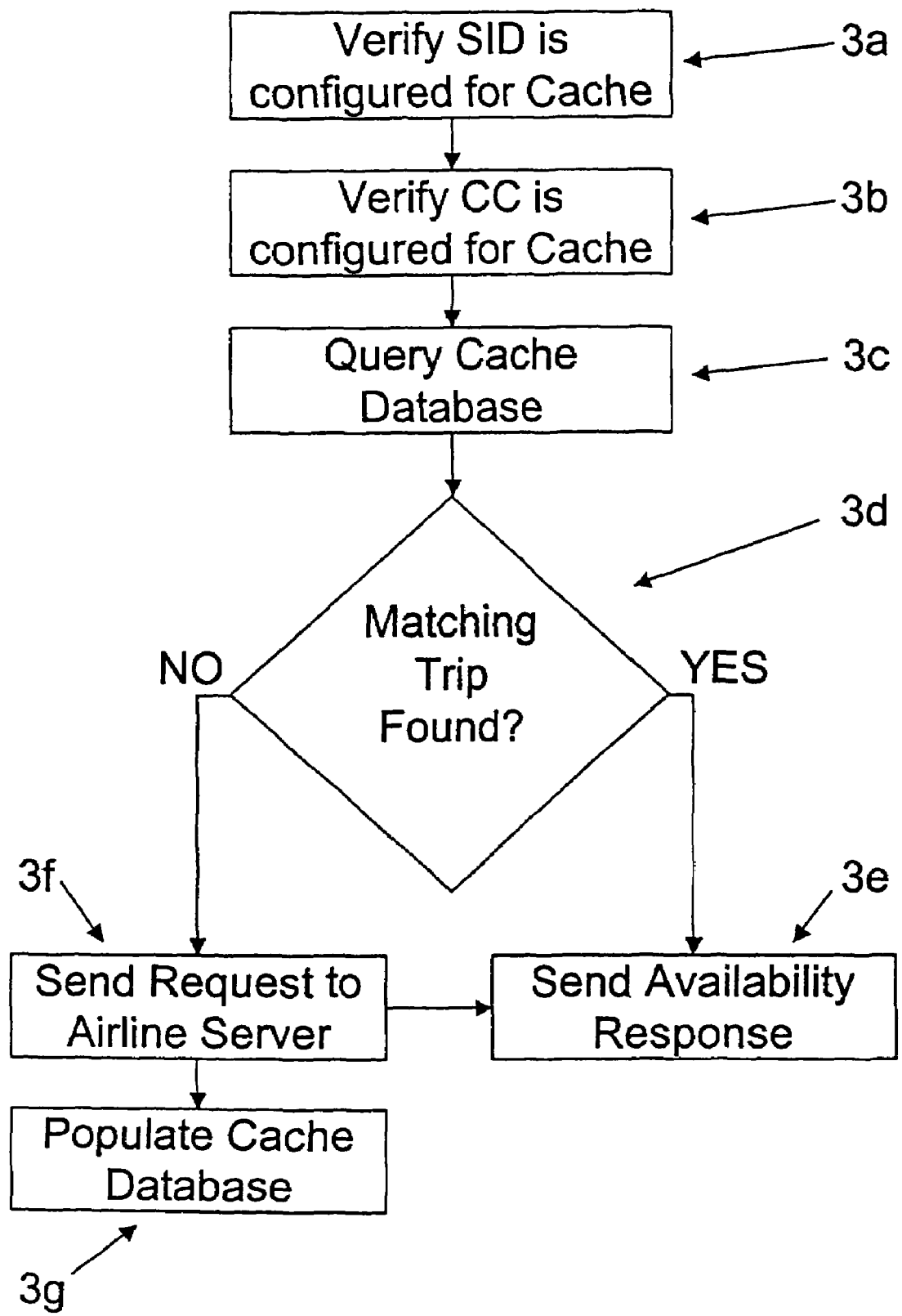
FIG. 3 illustrates processing logic for caching and utilizing airline flight availability data in accordance with an exemplary embodiment of the present invention.

The flow chart of FIG. 3 shows the functionality and operation of an exemplary implementation of the present invention in more detail. In this regard, some of the blocks of the flow chart may represent a module segment or portion of code of a program of the present invention which comprises one or more executable instructions for implementing the specified logical function or functions. In some alternative implementations, the functions noted in the various blocks may occur out of the order depicted. For example, two blocks shown in succession may in fact be executed substantially concurrently, or the blocks may sometimes be executed in the reverse order depending upon the functionality involved.

In use, as shown in FIG. 3, when the availability request is received, the system 10 verifies that the SID is configured to utilize the cache database 50, as shown in step 3a. The system 10 also verifies that the CC is configured to utilize the cache database 50, as shown in step 3b. The system 10 then queries the cache database 50 for the matching trip as specified in the availability request, as shown in step 3c. The system 10 attempts to find the matching trip in the cache database 50, as shown in step 3d. If the cache database 50 contains the matching trip, stored for use by the subscriber 20 that originated the availability request, then the availability response containing flight availability data for that trip is sent to the subscriber 20, as shown in step 3e. If no matching trip is found, then the real-time request is sent to the airline servers 25, as shown in step 3f. Flight availability data returned from the airline servers 25 in the real-time response is used to populate the availability response and the cache database 50, as shown in steps 3e and 3g.

If any step fails, the third party database may be used to fulfill the availability request. For example, when no matching trip exists in the cache database 50, the real-time request is sent to the appropriate airline server 25. If the real-time response is not received, then flight availability data from the third party database may be used to populate the availability response.

Additionally, the cache database 50 may be used in place of availability from an airline server 25 that is experiencing network congestion or outages. If system 10 sends the real-time request to one of the airline servers 25 and the real-time response is not received, the system 10 may use flight availability data stored in the cache database 50. If the matching trip does not exist in the cache database 50, the third party database may be used to populate the availability response.

Furthermore, the cache database 50 may be used in place of the third party database which may be inaccurate. Certain products typically used in conjunction with the system 10, such as the advanced search tools, may or may not need flight availability data received directly from the airline servers 25 and may currently rely on the third party database. Thus, flight availability data stored in the cache database 50 may be used to enhance the effectiveness of these products, while not placing burdens on the airline servers 25, by providing more accurate flight availability data than is available from the third party database.

The system and method for caching and utilizing flight availability have been described as computer-implemented processes. It is important to note, however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs, and transmission type media such as analog or digital communications links.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiment are possible without departing from the spirit and scope of the present invention. In addition, it is possible to use some of the features of the present invention without the corresponding use of the other features. Accordingly, the foregoing description of the exemplary embodiment is provided for the purpose of illustrating the principles of the present invention and not in limitation thereof since the scope of the present invention is defined solely by the appended claims.

What is claimed:

1. A method for caching and utilizing airline flight availability data for specific subscribers by an electronic distribution computer comprising the steps of:

configuring a cache database by the electronic distribution computer for each of a plurality of airlines using an airline cache control and for each of a plurality of subscribers using a subscriber cache control;

receiving an availability request from a subscriber by the electronic distribution computer over a communications network;

accessing a control list by the electronic distribution computer to verify that the subscriber can utilize the configured cache database for a particular airline corresponding to the received availability request for flight availability information;

querying the configured cache database for flight availability data of the particular airline stored for use by the verified subscriber and corresponding to the received availability request, wherein the flight availability data corresponding to the received availability request is includes OR associated with a minimum seat count;

retrieving the flight availability data corresponding to the received availability request for the verified subscriber if found in the configured cache database and if an available seat count of the found flight availability data corresponding to the received availability request is not less than the associated minimum seat count;

sending a real-time request for flight availability data from the electronic distribution computer over the communications network to an airline server database, if flight availability data corresponding to the received availability request is not found in the configured cache database or if available seat count of the found flight availability data in the configured cache database is less than the associated minimum seat count; and sending the flight availability data in response to the sent real-time request from the airline server database to the verified subscriber.

2. The method for caching and utilizing airline flight availability data of claim 1 further comprising the step of identifying a matching trip for the received availability request in the configured cache database by the electronic distribution computer.

3. The method for caching and utilizing airline flight availability data of claim 2 further comprising the step of obtaining flight availability data from a third party database by the electronic distribution computer over the communications network if a matching trip is not found in the configured cache database, and if no response is received in response to the real-time request sent to the airline server database.

4. The method for caching and utilizing airline flight availability data of claim 1 wherein the flight availability information stored in the configured cache database for a trip comprises a subscriber identification code, a carrier code, a boarding point, a class of service, a flight number, a date and a time for each flight in the trip.

5. The method for caching and utilizing airline flight availability data of claim 1 wherein the cache database is configured by the electronic distribution computer to cache flight availability information for a specific airline in a plurality of variable day ranges.

6. The method for caching and utilizing airline flight availability data of claim 5 wherein the plurality of day ranges varies based on an expected frequency of changes to the flight availability information.

7. The method for caching and utilizing airline flight availability data of claim 6 wherein flight availability information in each day range has an associated shelf life.

8. The method for caching and utilizing airline flight availability data of claim 7 wherein the associated shelf life for each day range is less than a predefined value.

9. The method for caching and utilizing airline flight availability data of claim 7 further comprising removing flight availability information for a trip in each day range from the configured cache database by the electronic distribution computer when the associated shelf life is exceeded.

10. The method for caching and utilizing airline flight availability data of claim 7 further comprising reducing the associated shelf life in a day range by the electronic distribution computer when a minimum seat count is reached.

11. An electronic distribution system for caching and utilizing airline flight availability data for specific subscribers comprising:

an electronic distribution computer including a processor for executing a plurality of components and communicating with at least one database;

a memory at the electronic distribution computer including a cache database for storing flight availability information;

an airline cache control component for configuring the cache database for each of a plurality of airlines;

a subscriber cache control component for configuring the cache database for each of the specific subscribers;

a component for receiving an availability request from a subscriber over a communications network;

a component for accessing a control list to verify that the subscriber can utilize the configured cache database for a particular airline corresponding to the received availability request for flight availability data;

a cache query utility for querying the configured cache database for flight availability data of the particular airline stored for use by the verified subscriber, wherein the flight availability data corresponding to the received availability request is associated with a minimum seat count;

a component for retrieving the flight availability data corresponding to the received availability request for the verified subscriber if found in the configured cache database and if an available seat count of the found flight availability data is not less than the associated minimum seat count;

a component for transmitting a real-time request for flight availability data from the electronic distribution computer over the communications network to an airline server, if flight availability data is not found in the cache database or if available seat count of the found flight availability data in the configured cache database is less than the associated minimum seat count; and a component for transmitting the flight availability data in response to the sent real-time request from the airline server to the verified subscriber.

12. The system for caching and utilizing airline flight availability data of claim 11 further comprising a component for identifying a matching trip for the received availability request in the configured cache database.

13. The system for caching and utilizing airline flight availability data of claim 11 wherein the flight availability data stored in the configured cache database for a trip comprises a subscriber identification code, a carrier code, a boarding point, a class of service, a flight number, a date and a time for each flight in the trip.

14. The system for caching and utilizing airline flight availability data of claim 11 wherein the cache database is configured by the electronic distribution computer to cache flight availability information for a specific airline in a plurality of variable day ranges.

15. The system for caching and utilizing airline flight availability data of claim 14 wherein the plurality of day ranges varies based on an expected frequency of changes to the flight availability information.

16. The system for caching and utilizing airline flight availability data of claim 15 wherein flight availability information in each day range has an associated shelf life.

17. The system for caching and utilizing airline flight availability data of claim 16 wherein the associated shelf life for each day range is less than a predefined value.

18. The system for caching and utilizing airline flight availability data of claim 16 wherein the cache query utility removes flight availability information for a trip in each day range from the configured cache database when the associated shelf life is exceeded.

19. A computer program product for caching and utilizing airline flight availability data for specific subscribers when executed on an electronic distribution computer comprising a computer readable medium having computer readable code embedded therein, the computer readable medium comprising:
   program instructions that configure a cache database for each of a plurality of airlines and for each of a plurality of subscribers;
   program instructions that receive an availability request from a subscriber over a communications network;
   program instructions that access a control list to verify that the subscriber can utilize the configured cache database for a particular airline corresponding to the received availability request for flight availability information;
   program instructions that query the configured cache database for flight availability data of the particular airline stored for use by the verified subscriber and corresponding to the received availability request, wherein the flight availability data corresponding to the received availability request is associated with a minimum seat count;
   program instructions that retrieve the flight availability data corresponding to the received availability request for the verified subscriber if found in the configured cache database and if an available seat count of the found flight availability data corresponding to the received availability request is not less than the associated minimum seat count;
   program instructions that transmit a real-time request for flight availability data over the communications network to an airline server, if flight availability data corresponding to the received availability request is not found in the configured cache database or if available seat count of the found flight availability data in the configured cache database is less than the associated minimum seat count; and
   program instructions that transmit the flight availability data in response to the sent real-time request from the airline server database to the verified subscriber.

20. The computer program product for caching and utilizing airline flight availability data of claim 19 further comprising program instructions that identify a matching trip for the received availability request in the configured cache database.

21. The computer program product for caching and utilizing airline flight availability data of claim 20 further comprising program instructions that obtain flight availability data from a third party database over the communications network if a matching trip is not found in the configured cache database, and if no response is received in response to the real-time request sent to the airline server.

22. The computer program product for caching and utilizing airline flight availability data of claim 19 wherein the flight availability information stored in the configured cache database for a trip comprises a subscriber identification code, a carder code, a boarding point, a class of service, a flight number, a date and a time for each flight in the trip.

23. The computer program product for caching and utilizing airline flight availability data of claim 19 further comprising program instructions that configure the cache database to cache flight availability information for a specific airline in a plurality of variable day ranges.

24. The computer program product for caching and utilizing airline flight availability data of claim 23 wherein the plurality of day ranges varies based on an expected frequency of changes to the flight availability information.

25. The computer program product for caching and utilizing airline flight availability data of claim 24 wherein the flight availability information in each day range has an associated shelf life.

26. The computer program product for caching and utilizing airline flight availability data of claim 25 wherein the associated shelf life for each day range is less than a predefined value.

27. The computer program product for caching and utilizing airline flight availability data of claim 25 further comprising program instructions that remove flight availability information for a trip in each day range from the configured cache database when the associated shelf life is exceeded.

28. The computer program product for caching and utilizing airline flight availability data of claim 25 further comprising program instructions that reduce the associated shelf life in a day range when a minimum seat count is reached.

* * * * *